Patented Jan. 22, 1952

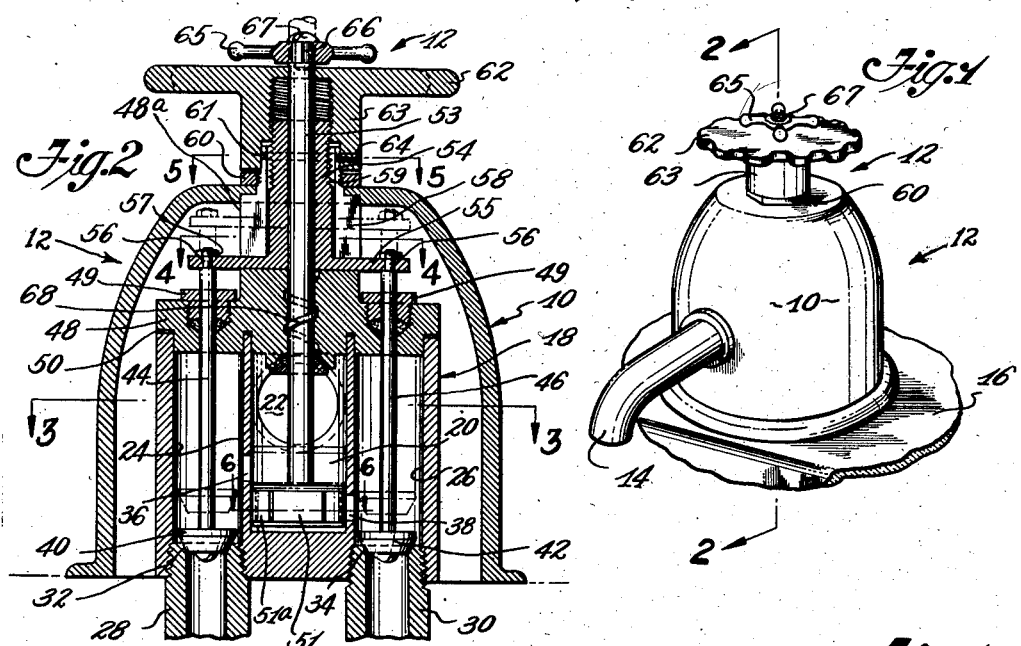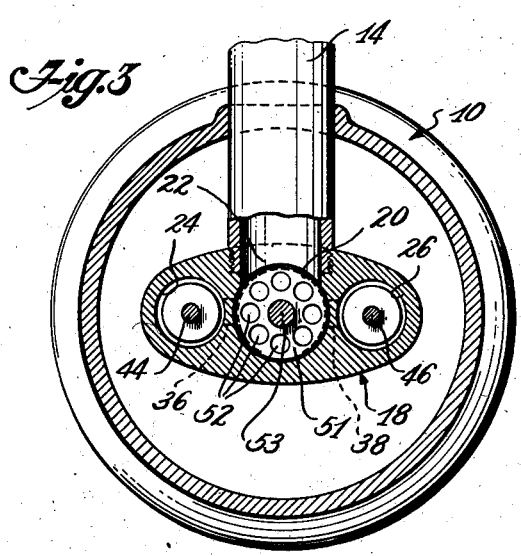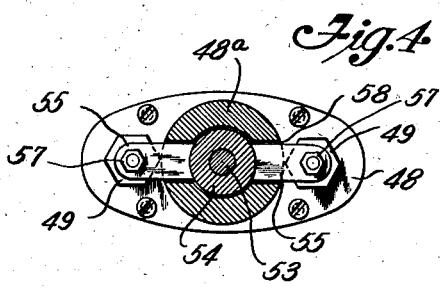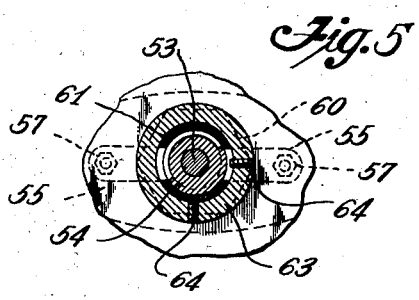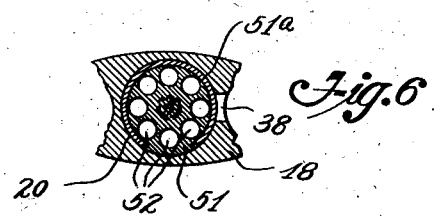

2,583,357

UNITED STATES PATENT OFFICE 2,583,357

FLUID CONTROL VALVE

Scott E. Campbell, Los Angeles, Calif.

Application March 4, 1947, Serial No. 732,201

2 Claims. (Cl. 277—50)

My invention relates to control valves for mixing fluids such, for instance, as hot and cold water, and is hereinafter described with particular reference to a combined mixing valve and faucet designed for domestic use, though the invention is not limited to such devices, but has a wide field of application.

An object of the invention is to provide a mixing valve provided with a single member effective to adjust the relative amounts of hot and cold water admitted to an outlet, such as a faucet, or to supply either hot or cold water to the faucet.

A further object of the invention is to provide a mixing valve effective to adjust the flow of hot or cold water or a mixture of hot and cold water together, to be discharged through a single outlet for use by manipulation of a dual control member.

Yet another object is to provide a mixing valve which may be readily disassembled when necessary, as, for instance, when replacing washers.

A still further object of the invention is to provide a control valve of the kind described, of simple construction, which is inexpensive to manufacture, but is very satisfactory in use.

Still further objects and features of the invention will hereinafter appear from the following description, taken in conjunction with the accompanying drawings.

In the drawings:

Fig. 1 is a perspective view of the complete control valve;

Fig. 2 is a cross section on the line 2—2 of Fig. 1, drawn to a larger scale;

Fig. 3 is a cross section on the line 3—3 of Fig. 2;

Figs. 4 and 5 are, respectively, cross sectional views on lines 4—4 and 5—5 of Fig. 2; and Fig. 6 is a section on line 6—6 of Fig. 2.

In Fig. 1 the numeral 10 indicates a housing for enclosing the valve structure which may be but not necessarily of two parts suitably attached to a wall or other support. The valve body is generally indicated at 12 and has a faucet 14 projecting therefrom for selectively discharging the mixture of hot and cold water or hot or cold water. The housing 10 and body 12 may be secured in any convenient manner to a surface, such as the top 16 of a wash basin, as hereinafter described.

In Fig. 2, 18 indicates a valve block provided with a central cylinder 20, closed at its lower end and having an outlet 22 into which the faucet 14 may be screwed after extrusion through the wall of housing 10. Two laterally spaced valve chambers 24 and 26 are formed in the valve block 18, and nipples 28 and 30 have their upper ends beveled to form valve seats 32 and 34, respectively, and are screwed into the lower ends of the chambers 24 and 26. A hot water pipe is adapted to be connected to nipple 28 and a cold water pipe is similarly adapted to be connected to nipple 30 by conventional fixtures, not shown. Since the hot and cold water pipes will usually be built into a wall fixture or partition, it is evident that the valve block 18 will be held immovable in housing 10 and on support 16, but if the pipes are not built into a wall or fixture, the housing 10 may be held against movement in any suitable manner. Ports 36 and 38 are formed in the wall separating the lateral valve chambers from the cylinder 20 at spaced points between the outlet 22 and the bottom of the cylinder for affording communication between the cylinder and valve chambers 24 and 26. Valves 40 and 42 are arranged to be moved onto and off of valve seats 32 and 34. Valves 40 and 42 have conical heads and stems 44 and 46, respectively, which are slidably extended through a head 48 and glands 49. Head 48 may be suitably attached to block 18 for closing the bores 24, 26 and cylinder 20. Packing glands 49 are provided around the valve stems, and a gasket 50 is arranged between the head 48 and valve block 18. The upper ends of the valve stems are connected with operating means so as to open and close the hot and cold water pipe inlets by means hereinafter described.

A proportioning piston 51 is fitted in the cylinder 20, and as shown in Fig. 4, is provided with a plurality of orifices 52 extending through the body of the piston so that fluid can flow through the piston below outlet 22. The piston is of such width that it can completely close either the hot water port 36 or cold water port 38. The piston is arranged so that in its lower-most position the hot water port is fully open and the cold water port is closed while as the piston is moved upwardly in the cylinder the hot water port is closed to an increasing extent, while the cold water port is opened to an increasing extent, the hot water flowing directly to the outlet 22, while the cold water flows into the cylinder and upwardly through the piston to the outlet. Obviously, the pipes used for hot or cold water could be reversed without affecting the functioning of the control valve.

The periphery of piston 51 may be fitted with a sealing ring 51a which may be in the form of a wide split ring adapted to slide over the ports 36 and 38 as piston 51 moves upwardly or downwardly.

A piston rod 53 is secured to the piston and extends through a hole drilled in a stub projecting inwardly from head 48 and fitted with a packing gland, into engagement with the operating means for the valve.

The operating means comprise a threaded plug 54 extending upwardly through a central opening in the housing 10 and furnished with oppositely extending arms forming a yoke 55 to which the upper ends of the valve stems 44 and 46 are secured as by means of reduced stems 56 thereon, extending through holes in the yoke and secured in place by nuts 57 mounted on threads formed on the upper ends of the stems.

The yoke 55 is guided for vertical movement in a slot 58 cut across an upward extension 48a of head 48, Fig. 4. The upper end of the extension 48a is furnished with an exteriorly threaded portion 59 extending above the top of housing 10.

It will be noted that, since the valve housing 18 is secured to the water pipes, or nipples, and head 48 is secured to the valve block, the head extension 48a affords a secure mounting member for the housing 10 which may be secured, in the embodiment shown in the drawings, by a nut 60 engaging on the threaded portion of the extension and holding the base of the housing 10 firmly against surface 16.

The head extension above the threaded portion is furnished with an annular channel 61.

The plug 54 is moved vertically by means of a hand wheel 62 having a central, downwardly extending boss 63 formed with an internally threaded bore engaging the threaded upper end of plug 54.

The hand wheel 62 is held against vertical displacement by set screws 64 engaging the annular channel 61 formed in the outer surface of the upper end 48a of member 48.

It will be evident that, since the hand wheel cannot move in a vertical direction and plug 54 cannot rotate, the latter must be displaced vertically either upward or downward, according to the direction of rotation of the hand wheel 62, carrying the valves 40 and 42 with it and, therefore, opening or closing the valves to a desired degree.

The proportioning piston 51 is separately operated by a second and smaller control member 65 which may be formed with radially projecting arms, and is secured by the engagement of a squared hole in the center thereof, fitting on a square 66 formed at the upper end of rod 53 and held thereon by a machine screw 67 engaging in a tapped hole bored in the upper end of the rod 53.

The rod 53 is moved vertically when rotated by means of a short length of projecting thread 68 formed on the surface thereof engaging in a screw thread formed in the wall of the bore in head 48 through which the rod passes. Sufficient travel is provided for the thread on rod 53 in head 48 to effect displacement of mixing valve 51 to the necessary extent on turning member 65 in one direction or the other to secure the desired mixture of hot and cold water.

I claim:

1. A fluid mixture valve including: a valve block; a cylinder formed in said valve block; a pair of chambers formed in said valve block adjacent said cylinder; a conduit for the passage of a fluid opening into one chamber; a conduit for the passage of fluid having different characteristics from the first mentioned fluid opening into the other chamber; valves controlling the openings of said conduits arranged in said chambers; a head member closing the open ends of the chambers and of said cylinder; valve stems connected to said valves and projecting through said head; an axially displaceable member providing a yoke connected to said valve stems; a rotatable control member engaging with said axially displaceable member and effective to displace said yoke to open and close said valves in unison to vary the quantity of fluid flowing into said cylinder and out of the mixing valve; a member effective to permit rotation of said rotatable control member but restraining it against axial movement relative to said valve block; ports leading from said chambers into said cylinder and spaced apart axially of said cylinder; a proportioning piston arranged for axial movement in said cylinder and having passages extending from the lower face to the upper face thereof; a piston rod connected to said piston and extending from said cylinder and through said head and rotatable member; and means for axially displacing said piston rod to control the relative proportion of the fluids flowing into the cylinder without affecting the adjustment of said rotatable control member.

2. A valve structure for mixing fluids having different characteristics comprising: a body formed with a cylinder, a pair of chambers in said body having axes paralleling the axis of said cylinder, said chambers having separate fluid inlets and separate ports opening to said cylinder at points spaced apart longitudinally of the cylinder, valves controlling the flow of fluid from said inlets to said chambers, a piston reciprocable in said cylinder relative to and for regulating the opening and closing of said ports to mix the fluids from said chambers, a spout open to said cylinder at a point outwardly from said ports for discharging the mixed fluids, a head forming a common closure for said cylinder and said chambers, a valve operating device including a manually rotatable member and an axially movable member operative by rotation of the rotatable member for simultaneously and correspondingly opening and closing said valves, and a manually reciprocable member connected with said piston and coaxial with said piston for axially moving said piston, said axially movable member being operatively connected with said valves.

SCOTT E. CAMPBELL.

REFERENCES CITED

The following references are of record in the file of this patent:

UNITED STATES PATENTS

| Number | Name | Date |
|---|---|---|
| 1,656,448 | Schumacher | Jan. 17, 1928 |
| 1,730,534 | Rosenbaum | Oct. 8, 1929 |
| 1,855,359 | McNamara | Apr. 26, 1932 |
| 2,354,608 | Orshansky | July 25, 1944 |